(12) United States Patent
Buchmueller et al.

(10) Patent No.: US 9,129,020 B2
(45) Date of Patent: Sep. 8, 2015

(54) SEARCH RESULTS THROUGH INTEREST CIRCLES

(71) Applicant: Microsoft Corporation, Redmond, WA (US)

(72) Inventors: Daniel Buchmueller, Seattle, WA (US); Meir Ben Itay, Sammamish, WA (US); Min Liu, Redmond, WA (US); Jose Saura, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 13/725,437

(22) Filed: Dec. 21, 2012

(65) Prior Publication Data

US 2014/0181093 A1  Jun. 26, 2014

(51) Int. Cl.
*G06F 17/30* (2006.01)
(52) U.S. Cl.
CPC ...... *G06F 17/30864* (2013.01); *G06F 17/3053* (2013.01); *G06F 17/30699* (2013.01); *G06F 17/30867* (2013.01)
(58) Field of Classification Search
USPC ............... 707/2, 3; 709/204–206; 705/5, 326
See application file for complete search history.

(56) References Cited

U.S. PATENT DOCUMENTS

| | | | |
|---|---|---|---|
| 7,603,350 B1 | 10/2009 | Guha | |
| 7,664,735 B2 | 2/2010 | Zhang et al. | |
| 7,979,415 B2 * | 7/2011 | Shen et al. | 707/706 |
| 2009/0204599 A1 * | 8/2009 | Morris et al. | 707/5 |
| 2009/0222431 A1 | 9/2009 | Kumar | |
| 2012/0233161 A1 | 9/2012 | Xu et al. | |
| 2012/0278317 A1 | 11/2012 | Spiegel | |
| 2013/0085955 A1 * | 4/2013 | Dugas | 705/326 |

OTHER PUBLICATIONS

WRTTNWRD., "Growing Your Audience with Random Affinities", Retrieved at <<http://www.seomoz.org/blog/growing-your-audience-with-random-affinities>>, Aug. 28, 2012, pp. 19.

Pantel, et al., "Social Annotations: Utility and Prediction Modeling", Retrieved at <<http://www.patrickpantel.com/download/papers/2012/sigir12.pdf>>, Proceedings of the 35th international ACM SIGIR conference on Research and development in information retrieval, SIGIR '12, Aug. 12, 2012, pp. 10.

(Continued)

*Primary Examiner* — Etienne Leroux
(74) *Attorney, Agent, or Firm* — Dave Ream; Danielle Johnston-Holmes; Micky Minhas

(57) ABSTRACT

Systems, methods, and computer-readable media for responding to a search query with search results ranked according to interest circles of a plurality of computer users are presented. Interest circles are formed from a computer user's navigation data, including the computer user's navigation history. A search query is received from a requesting computer user. The search query is directed to a query topic or set of query topics. A set of search results responsive to the search query are obtained. A plurality of computer users, each of the plurality of computer users having an established interest circle corresponding to the query topic, is identified. The set of search results are then ordered according to the interest circles of the identified plurality of computer users. Thereafter, the higher ordered search results are returned to the requesting computer user in response to the search query.

18 Claims, 8 Drawing Sheets

(56) References Cited

OTHER PUBLICATIONS

Qiu, et al., "Automatic Identification of User Interest for Personalized Search", Retrieved at <<http://www2006.org/programme/files/pdf/580.pdf>>, Proceedings of the 15th international conference on World Wide Web, WWW '06, May 22, 2012, pp. 9.

Holub, et al., "Estimation of User Interest in Visited Web Page", Retrieved at <<http://wwwconference.org/proceedings/www2010/www/p1111.pdf>>, Proceedings of the 19th international conference on World Wide Web, WWW '10, Apr. 26, 2012, pp. 2.

Agichtein, et al., "Improving Web Search Ranking by Incorporating User Behavior Information", Retrieved at <<http://clair.si.umich.edu/si767/papers/Week09/search_log_mining/Agichtein06.pdf>>, Proceedings of the 29th annual international ACM SIGIR conference on Research and development in information retrieval, Aug. 6, 2006, pp. 8.

"International Search Report & Written Opinion for PCT Patent Application No. PCT/US2013/077350", Mailed Date: Aug. 18, 2014, Filed Date: Dec. 21, 2013, 10 Pages.

"Written Opinion of the International Preliminary Examining Authority", Mailing Date Dec. 9, 2014, Application No. PCT/US2014/100790, filed Dec. 21, 2013, 8 pages.

\* cited by examiner

SEARCH RESULTS THROUGH INTEREST CIRCLES

BACKGROUND

The basic model of search engines is to receive a search query from a computer user, identify search results corresponding to the subject matter or topic of the search query, and generate and return one or more web pages of search results based on the identified search results. Indeed, beyond the basic model, to improve the user experience and keep the computer user returning to the search engine, most search engines rank and sort the identified search results in an effort to present the most relevant search results to the user in the first search results page. If the desired result (or a desired result) is found on the first search results page, the user is not forced to iterate through multiple pages searching for the search result (or search results) that is desired.

Search engines use a variety of methods, techniques, and heuristics to tailor search results according to a specific computer user's interests. By tailoring the search results to the computer user's preferences the most relevant and, therefore, desirable search results are presented to the computer user in the first search results page (or at least one of the early search results pages.) One technique is to look to the computer user's social network for preferences. However, when the computer user has no specific preference and/or history with a particular topic, and if the computer user's social network similarly has no preference or history with regard to the search topic, tailoring the search results to the computer user can be challenging and often reverts to simply web page popularity.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, method, systems, and computer-readable media, configured for responding to a search query with search results ranked according to interest circles of a plurality of computer users, are presented. A search query is received from a requesting computer user, where the search query is directed to a query topic or set of query topics. Search results responsive to the search query are obtained. The set of search results are then ordered according to the interest circles of an identified plurality of computer users. Thereafter, the higher ordered search results are returned to the requesting computer user in response to the search query.

According to additional aspects of the disclosed subject matter, methods, systems, and computer readable media, configure for responding to a search query with search results ranked according to interest circles of a plurality of computer users, are presented. Network navigation data corresponding to a plurality of computers users is obtained, and for each of the plurality of computer user the set of interest circles is identified and stored. A search query is received from a requesting computer user, where the search query is directed to a query topic or a set of query topics. Search results responsive to the search query are obtained. The set of search results are then ordered according to the interest circles of an identified plurality of computer users. Thereafter, the higher ordered search results are returned to the requesting computer user in response to the search query.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the use of the term "exemplary" in this document should be interpreted as serving as an illustration or example of something, and it should not be interpreted as an ideal and/or a leading illustration of that thing.

An interest circle should be understood as being a set of network references corresponding to a particular topic comprising network sites, universal resource locators (URLs), network-available content, online services, and the like. An interest circle is generated for a computer user based on navigation data for the computer user. The navigation data corresponds to network sites, locations, content, and services accessed by the computer user. In addition to location information, the navigation data may further include computer user interaction data with the various locations, such as hyperlink selections, products purchased at a particular network site, content that is retrieved and/or downloaded, the frequency of visits and interaction, and the like. A computer user's navigation data is tracked (typically by the computer user's computing device) and used to generate interest circles for the computer user. Gathering/tracking navigation data for a computer user continues over time and, correspondingly, interest circles for the computer user are updated over time.

As a computer user explores some new aspect in his/her life, the computer user will often search the Internet for information. In particular, the computer user will often turn to a search engine to find online information about a specific topic. While the search engine may have a user profile corresponding to the computer user, if the user is searching for information on a new topic the search engine will not have learned any preferences regarding the topic of the computer user's prior searches (or online activity). Moreover, it is often the case that the user may not have a well-established social network of that the user's social network does not exhibit any experience and/or preferences toward a particular topic. Rather than giving generic answers that may or may not be relevant to the computer user, a search engine configured according to aspects of the disclosed subject matter can identify a set of computer users from the many computer users for whom an interest circle corresponding to the query topic (or query topics) has been established, and use the interest circles of the identified computer users to provide more relevant search results to the computer user. According to aspects of the disclosed subject matter, the set of computer users are identified independent of any social network or other established relationships with the computer user.

Figure 1:
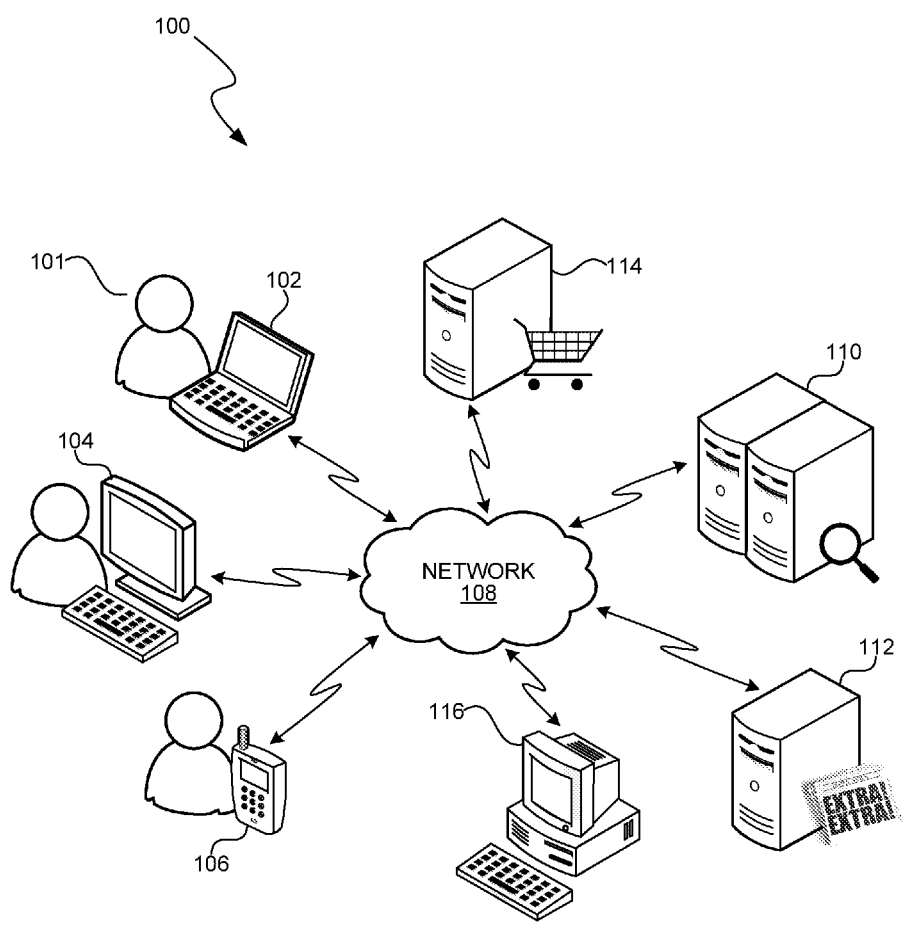
FIG. 1 is a block diagram illustrating an exemplary networked environment suitable for implementing aspects of the disclosed subject matter.

Turning now to the figures, FIG. 1 is a block diagram illustrating an exemplary networked environment 100 suitable for implementing aspects of the disclosed subject matter, including responding to a computer user's search query with search results having improved relevancy based on interest circles. The illustrative networked environment 100 includes one or more user computers, such as user computers 102-106, connected to a network 108, such as the Internet, a wide area network or WAN, and the like. Also connected to the network 108 is a search engine 110 configured to provide search results in response to search queries received from one or more computer users, such as computer user 101 by way of user computer 102 over the network 108. According to aspects of the disclosed subject matter, the search results provided to the computer user from the search engine 110 in response to a search query will be improved through the use of interest circles of one or more other computer users.

Those skilled in the art will appreciate that, generally speaking, a search engine 110 corresponds to an online service hosted on one or more computers, or computing systems, located and/or distributed throughout the network 108. The search engine 110 receives and responds to search queries submitted over the network 108 from various computer users, such as computer user 101 using user computer 102 over the network 108. In particular, responsive to receiving a search query from a computer user, the search engine 110 obtains search results information related and/or relevant to the received search query (as defined by the terms of search query.) The search results information includes search results, i.e., references (typically in the form of hyperlinks) to relevant and/or content available at various network locations located throughout the network 108, such content sites 112-116. The content sites may include (by way of illustration and not limitation): news outlets/portals/sources, such as content site 112; online shopping sites, such as online shopping site 114; personal blogging and post sites, such as blogging site 116; social media sites (not shown); educational and research sites (not shown); and the like.

As mentioned above, as a computer user, such as computer user 101, navigates to the various networked content sites 112-116, the computer user's navigation history is tracked. In at least one embodiment, the computer user's computing device, such as computing device 102, is configured to track and compile the computer user's navigation data that is used to generate the interest circles for the computer user.

In addition to providing search results in response to a search query, the search engine 110 is further configured to receive network navigation data for a plurality of computer users, such as the computer user's associated with user computers 102-106. As the number of computer users that submit network navigation data to the search engine 110 increases, so too do the number of interest circles that are developed (a set of interest circles for each of the computer users) and the more likely that the search engine will be able to locate more relevant search results.

Figure 2:
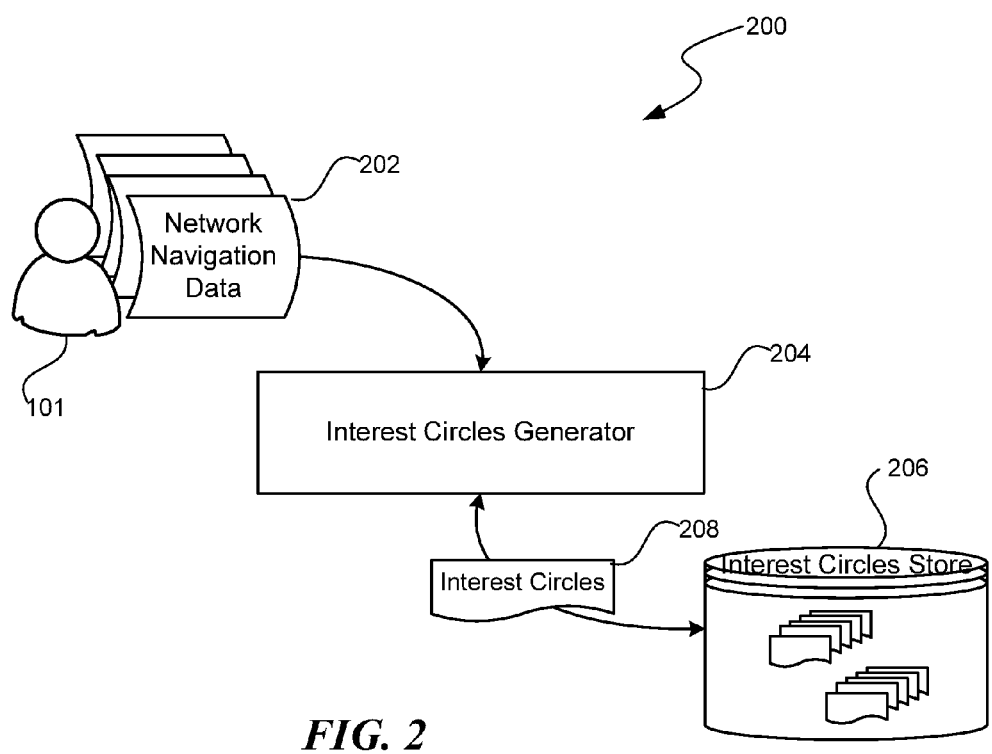
FIG. 2 is block diagram illustrating the process flow of a computer user's network navigation data to interest circles that are stored in an interest circles store.

In regard to generating a set of interest circles for a computer user, FIG. 2 is block diagram illustrating the process flow 200 of a computer user's network navigation data to interest circles that are stored in an interest circles store. As shown in FIG. 2, a computer user's network navigation data, such as the network navigation data 202 for computer user 101, is provided to an interest circles generator 204 (which may be part of a suitably configure search engine 110 but, alternatively, may be implemented as a separate service). In yet an alternative embodiment, the interest circles generator 204 may be included as part of a computer user's computing device, such as computing device 102. As suggested above, in at least one embodiment, a computer user's navigation data is tracked and recorded on the computer user's computer. This information is then provided to the interest circles generator 204. The interest circles generator 204 evaluates and analyzes the computer user's network navigation data 202 in order to identify one or more interest circles (i.e., a set of interest circles 208) for the computer user 101. The set of interest circles 208 is stored in an interest circles store 206 along with interest circles for other computer users.

According to one embodiment of the disclosed subject matter, each set comprises one or more interest circles. Each interest circle has a topic and one or more network references, including network sites, which correspond to that topic. Generally speaking, associated with each network site in an interest circle is a value indicating the importance of the network site to of the interest circle. This importance value is determined by the interest circles generator 204 in evaluating and analyzing the computer user's network navigation data 202. According to various aspects of the disclosed subject matter, the importance of a network site may be based on the frequency of visits that the computer user made to the network site, the amount of activity of the computer user at the network site, the importance or significance of the computer user's activity at the network site (i.e., if the computer user purchased a particular item, "liked" a particular entity, etc.), the unusual-ness of the activity at a particular site, and the like.

Figure 3:
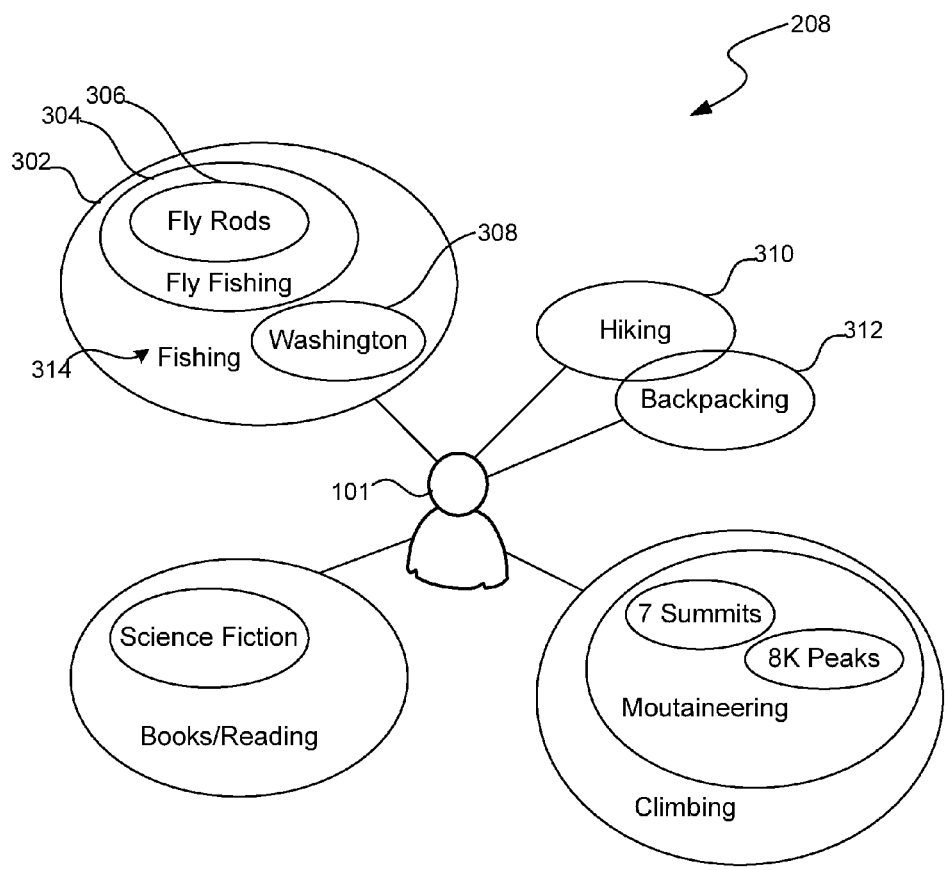
FIG. 3 is a block diagram illustrating an exemplary set of interest circles for a computer user.

Turning to FIG. 3, FIG. 3 is a block diagram illustrating an exemplary set 300 of interest circles for a computer user 101. As can be seen in the exemplary set 300, a computer user 101 may have any number of interest circles (such as interest circles 302-312). As already mentioned, each interest circle is associated with a topic (such as topic 314 "fishing") and includes one or more network sites (not shown.) Moreover, for each interest circle (having a corresponding topic) there may be one or more additional interest circles corresponding to sub-topics. For example, interest circle 302 which corresponds to topic 314 "fishing" encompasses interest circles 304-308, each of which includes a sub-topic of topic 314 "fishing." As previously mentioned, interest circles include information regarding network sites. However, as shown by the overlap of interest circles 310 and 312, a particular network site may be found in more than one interest circle. Inclusion of a network site in an interest circle depends on the content/subject matter of the network site.

While the search engine 110 maintains the association of the computer user 101 to the user's set of interest circles 208, the sets of interest circles stored in the interest circles store 206 are anonymized (i.e., the information is modified or obscured in a fashion such that the corresponding computer user can remain anonymous). In this way, the interest circles of all users can be utilized to improve relevance of search results for a computer user without revealing identifying information as to their sources (i.e., the computer users to which the various sets of interest circles belong). In at least one embodiment, in the case that there is not a minimum threshold of computer users having an interest circle for a particular query topic, the interest circles for that query topic may be excluded from use in improving search results in order to protect user privacy.

In regard to the process flow 204 (FIG. 2), in addition to generating an initial set of interest circles for a computer user 101 based on the computer user's network navigation data, the interest circles generator 204 may first determine whether a set of interest circles has already been generated for the computer user. If so, the set of interest circles may be included in the analysis/evaluation of the network navigation data 202 and an updated set of interest circles are stored in the interest circles store 206.

In using interest circles to improve relevance of search results, a search engine will obtain the interest circles of the requesting computer user (i.e., the computer user that has submitted a search query to the search engine) and determine whether the user has already established an interest circle for the search topic, the subject matter of the search query. If not, the search engine identifies a plurality of sets of interest circles corresponding to other computer user that have an established interest circle corresponding to the search topic. According to aspects of the disclosed subject matter, in locating sets of interest circles that include an interest circle corresponding to the search topic, the search engine 110 identifies computer users that have interest circles in common with the requesting computer user in addition to an interest circle covering the search topic. To illustrate, reference is made to FIG. 4.

Figure 4:
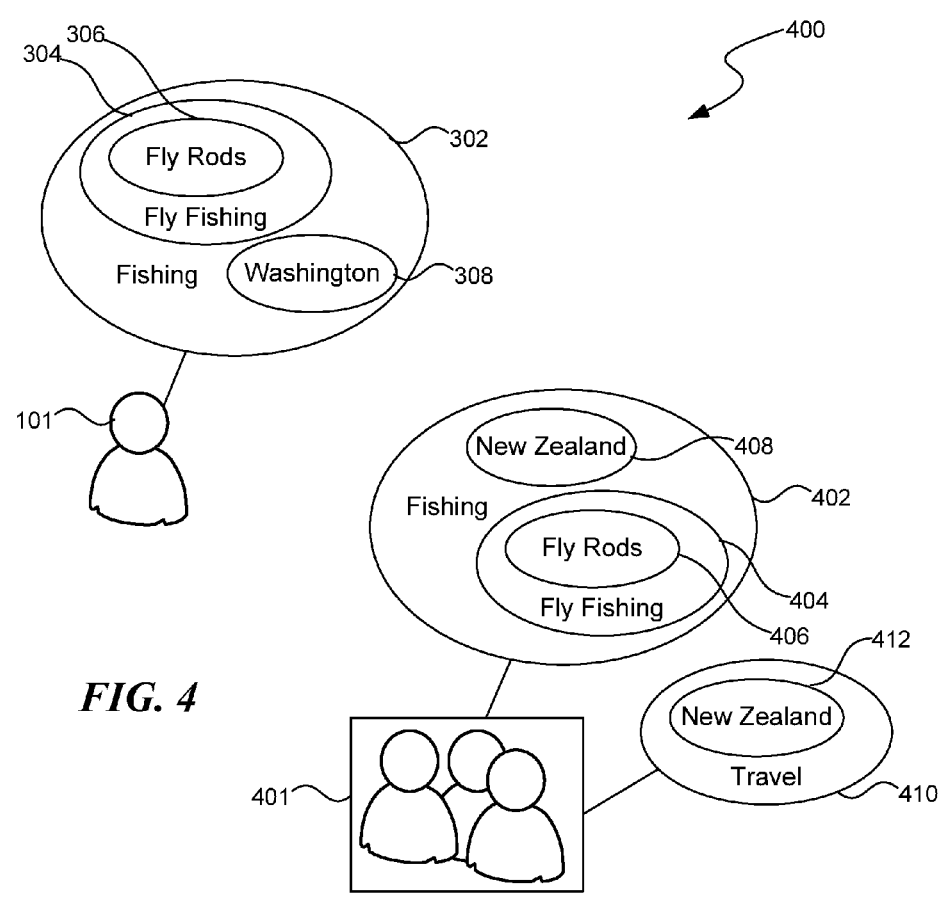
FIG. 4 is a block diagram illustrating exemplary interest circles for a computer user in comparison to the interest circles of a group of computer users.

FIG. 4 is a block diagram 400 illustrating exemplary interest circles 302-308 for a computer user 101 in comparison to the interest circles 402-412 of a group of computer users 401. As will become apparent through the subsequent discussion, generally speaking, the group 401 of computer users is formed because they (the members of the group) each have an established interest circle with regard to the query topic, irrespective of any user-established relationship with the requesting computer user. Moreover, for this example it is assumed that the search/query topic is "Fishing in New Zealand." As can be seen in the diagram 400, computer user 101 has an interest circle 302 corresponding to "fishing" as well as an interest circle 308 correspond to "Washington." However, computer user 101 lacks any predetermined interest in regard to "Fishing in New Zealand." In response, the search engine 110 identifies a group 401 of computer users whose interest circles include both "fishing" (interest circle 402) as well as "fishing in New Zealand" (interest circle 408), which covers the search topic. Moreover, as can be seen, there is at least some additional overlap between the requesting computer user's interest circles (including interest circles 304 and 306) and the interest circles of the group 401 of computer users, including interest circles 404 and 406.

In regard to identifying members of the group 401 of computer users that have interest circles directed to the query topic, it is often advantageous to select computer users that have at least a threshold of interest circles in common with the requesting computer user. As shown in FIG. 4, the group 401 of computer users that has been identified as having an interest circle 408 directed to the example query topic also has other interest circles in common with requesting computer user 101. Indeed, the interest circles 302-306 for requesting computer user 101 are also common to the group 401 of computer users, in particular interest circles 402-406. Of course, the common interest circles illustrated in FIG. 4 are generally related to the query topic, "fishing in New Zealand." A non-limiting example of a threshold in similarity or commonality may be that at least 30% of the interest circles of the requesting computer user are common to those of each of the members of the group 401 of computer users.

While it may be advantageous to find a group of computer users having common interest circles with the requesting computer user that area related to the query topic, it is not a requirement. Indeed, there may be instances when a set of computer users have an interest circle regarding a particular topic but do not have a threshold amount of common interest circles with the requesting computer user and yet it is still advantageous to rely on that set of computer users. For example, there may exist a group of computer users that are considered experts with regard to a particular topic. When a search query from a requesting computer user is received, it may be disadvantageous to not include the interest circles of the experts with regard to the query topic simply because they do not otherwise have a threshold commonality between interest circles with the requesting computer user. Accordingly, in addition to locating computer users that have common interest circles with the requesting computer user (in addition to an interest circle directed to the query topic), the search engine 110 may also include computer users that do not have a threshold commonality of interest circles with the requesting computer user but for other reasons (authority, expert, popularity, etc.) are included in the group 401 of computer users who have an interest circle pertaining to the query topic.

It should be appreciated that in addition to having an interest circle directed to the query topic, the group 401 of computer users will also have other interest circles, some of which may or may not be shared in common with the requesting computer user. Advantageously, inferences may be made based on the interest circles of the group 401 of computer users. Continuing the example of FIG. 4, the requesting computer user 101 does not have an interest circle corresponding to "fishing in New Zealand" and, as such, the group 401 of computer users is identified that do share an interest circle 408 for the topic. In addition to the interest circle 408 for "fishing in New Zealand," this group also includes an interest circle 410 for "travel" and, as a sub-topic, an interest circle 412 for "travel in New Zealand." Based on these factors, the search engine 110 can make an inference that, in addition to information on "fishing in New Zealand", computer user 101 may also wish to receive information regarding traveling to New Zealand and supply include search results related to this latter topic in the response to the computer user's search query. Similar to the above, inferences may often best be determined from a group 401 of computer users that have a high threshold of commonality with regard to interest circles, but this may be countered with computer users that are experts in or authorities to a particular inferred topic.

Figure 5:
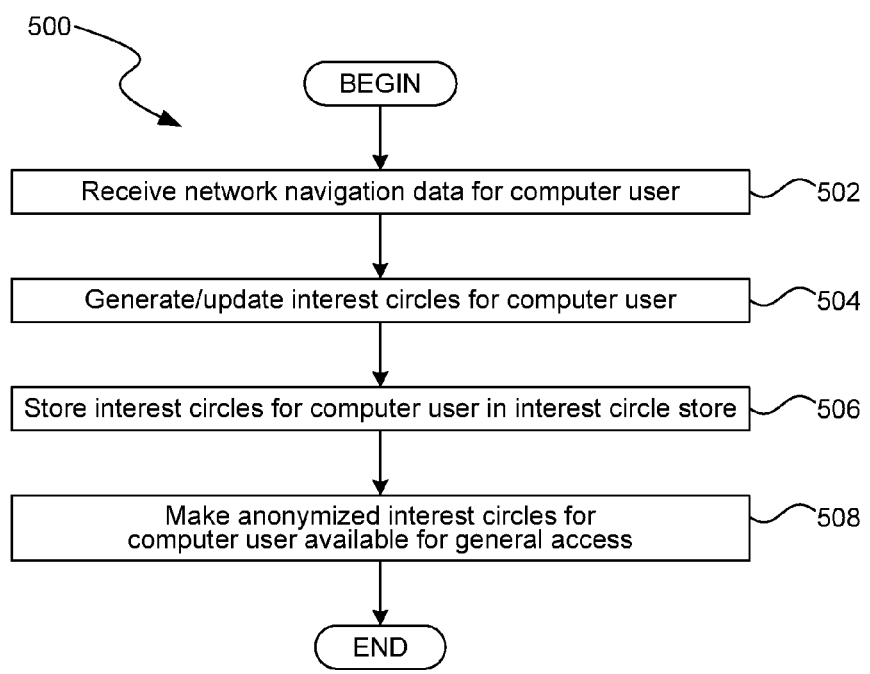
FIG. 5 is a flow diagram illustrating an exemplary routine for processing the network navigation data of a computer user into one or more interest circles corresponding to the computer user.

Turning now to FIG. 5, this figure is a flow diagram illustrating an exemplary routine 500 for processing the network navigation data 202 of a computer user 101 into one or more interest circles corresponding to the computer user. Beginning at block 502, the network navigation data 202 for the computer user 101 is received. As mentioned above, the network navigation data 202 may include (by way of illustration and not limitation) network locations to which the computer user 101 has navigated (e.g., via a browser on a computing device, such as computing device 102); search queries submitted to a search engine 110; activity conducted at various network sites, such as purchases, examinations of details and related items, and the like; storage and retrieval of network content; and the like.

Using the network navigation data 202 (as well as other available information related to the computer user, such as a user profile), at block 504 the interest circles generator 204 analyzes and evaluates the network navigation data 202 to identify various topics. In addition to the network navigation data 202, the interest circles generator 204 may retrieve the existing interest circles 208 corresponding to the computer user 101 that are maintained in the interest circles store 206. If a set of interest circles 208 exists for the computer user 101, this may serve as a basis for the evaluation/analysis of the network navigation data 202.

As part of analyzing the network navigation data 202, the interest circles generator 204 may retrieve the content of the various network sites and mine the content to identify one or more topics. According to aspects of the disclosed subject matter, analyzing and mining the network navigation data may involve any number of heuristics including, but not limited to: computer-learning; data clustering; data analysis based on term frequency and inverse document frequency; and the like. The network sites (as well as other data that is included in the network navigation data 202) are associated with the identified topics which then become interest circles for the computer user. The number of visits to a particular network site (or a particular section of a network site), the amount of times the computer user spends with regard to a network site, the type and number of actions that the computer user makes at the network site, as well as other criteria, may be captured with regard to the interest circle such that some network sites in the interest circle are considered more important (or of higher relevancy) to the interest circle's topic and/or to the computer user.

Once the analysis of the network navigation data 202 is complete, at block 506 the interest circles generator 204 stores the set of interest circles 208 for the computer user 101 in an interest circles store 206. As part of storing the set of interest circles, the various topics (and sub-topics) of the interest circles in associate with the computer user may be stored and/or indexed such that the information may be found in regard to satisfying a search query from another user. At block 508, according to at least one non-exclusive embodiment and as indicated above, while the set of interest circles 208 is associated with the computer user 101, the set of interest circles is stored such that personal identifying information is obscured. In an alternative embodiment (not shown), the personal identifying information is not obscured on storage but all personal identifying information is obscured as the set of interest circles is accessed in regard to satisfying a search query from another computer user. Thereafter, the routine 500 terminates.

Figure 6:
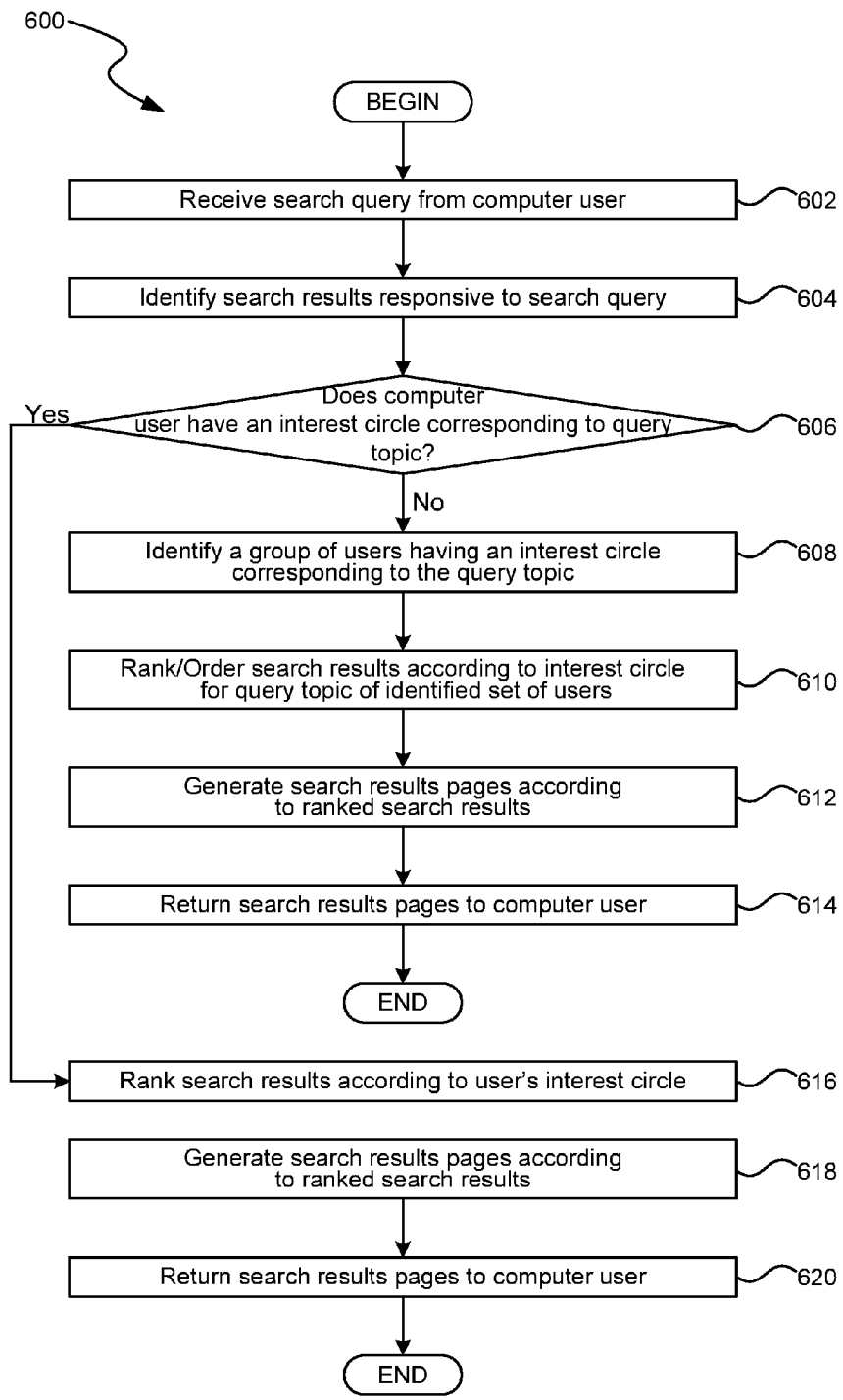
FIG. 6 is a flow diagram illustrating an exemplary routine for responding to a search query from a requesting computer user with search results ranked and ordered according to the interest circles of other computer users.

Once interest circles for a variety of computer users are established and stored in the interest circles store 206, the search engine 110 can improve search results by accessing them. FIG. 6 is a flow diagram illustrating an exemplary routine 600 for responding to a search query from a requesting computer user 101 with search results having improved relevancy according to the interest circles of other computer users. Beginning at block 602, the search engine 110 receives a search query from a requesting computer user, such as computer user 101. At block 604, the search engine 110 identifies a plurality of search results that are responsive to the search query.

At decision block 606, a determination is made as to whether the requesting computer user has an established interest circle with regard to the query topic. If not, the routine 600 proceeds to block 608. At block 608, a set of computer users having an interest circle corresponding to the query topic are identified. As mentioned above, this set or group 401 of computer users may be selected according to those that have common interest circles, including those that have common interest circles above a predetermined threshold. Additionally, members of the group 401 of computer users may also be selected based on the fact that they are an authority on the query topic.

At block 610, the identified search results are ranked and/or ordered, at least in part, according to the interest circles corresponding to the query topic of the identified group 401 of computer users. Ranking or ordering search results according to the interest circles corresponding to the query topic of the identified group 401 of computer users may include determining the most popular network sites (which correspond to search results) in the interest circle, the sites that have the most activity, and so on. For purposes of clarity, the higher ranked or ordered search results are viewed as the more relevant search results with regard to the query topic.

At block 612, the search engine 110 generates one or more search results pages from the ranked and/or ordered search results. At block 614, one or more search results pages are returned to the requesting computer user in response to the search query. Thereafter, the routine 600 terminates.

In the alternative to the requesting computer user not having an interest circle corresponding to the query topic, if the computer user does have an interest circle corresponding to the query topic the routine 600 proceeds from decision block 610 to block 616. At block 616, the identified search results are ranked, at least in part, according to the information in the requesting computer user's interest circle corresponding to the query topic. At block 618, the search engine 110 generates one or more search results pages from the ranked and/or ordered search results. At block 620, one or more search results pages are returned to the requesting computer user in response to the search query. Thereafter, the routine 600 terminates.

As yet an alternative embodiment of routine 600 (not shown), even if the requesting computer user has an established interest circle corresponding to the query topic, the search engine may proceed to block 608 in identifying a group 401 of computer users having an interest circle corresponding to the query topic. However, in this alternative embodiment, the group 401 of computer users will include the requesting computer user. This alternative embodiment may be implemented when the interest circle of the requesting computer user corresponding to the query topic does not include sufficient data to meet a predetermined threshold.

Regarding routines 500 and 600, it should be appreciated that while these routines are expressed in regard to discrete steps, these steps should be viewed as being logical in nature and may or may not correspond to any actual and/or discrete steps. Nor should the order that these steps are presented in the various, illustrative routines be construed as the only order in which the steps may be carried out. Indeed, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 500 and 600 may be carried out in parallel or in series. Often, but not exclusively, the functionality of the various routines is embodied in software (e.g., applications, system services, libraries, and the like) that is executed on computer hardware and/or systems described below in regard to FIG. 700.

Additionally, while many novel aspects of the disclosed subject matter are expressed in routines, applications (also referred to as computer programs), and/or methods, these aspects may also be embodied as computer-executable instructions stored in computer-readable media (also referred to as computer-readable storage media). As those skilled in the art will appreciate, computer-readable media can host computer-executable instructions for later retrieval and execution. When executed on a computing device, the computer-executable instructions stored on one or more computer-readable storage devices carry out various steps, methods and/or functionality, including those steps, methods, and routines described above in regard to routines 500 and 600. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 7:
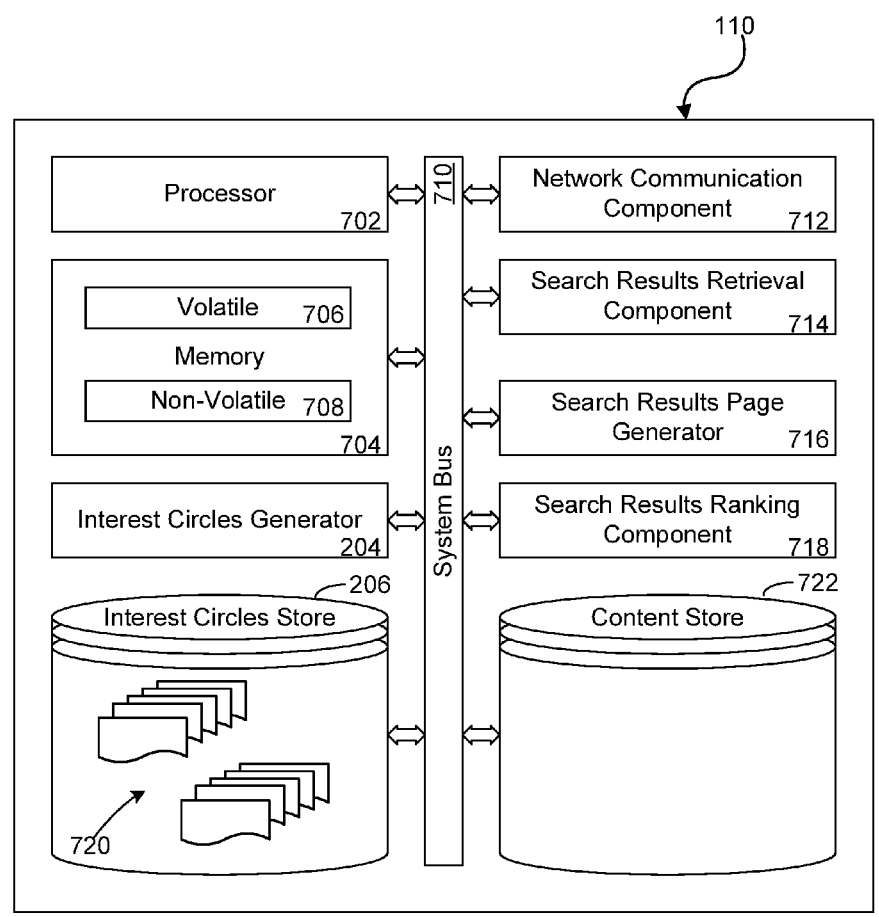
FIG. 7 is a block diagram illustrating an exemplary search engine configured according to aspects of the disclosed subject matter.

Turning now to FIG. 7, this figure is a block diagram illustrating an exemplary search engine 100 configured according to aspects of the disclosed subject matter, particularly for providing improved search results to a search query based on (at least in part) interest circles. The search engine 700 includes a processor 702 (or processing unit) and a memory 704 interconnected by way of a system bus 710. As those skilled in the art will appreciated, memory 704 typically (but not always) comprises both volatile memory 706 and non-volatile memory 708. Volatile memory 706 retains or stores information so long as the memory is supplied with power. In contrast, non-volatile memory 708 is capable of storing (or persisting) information even when a power supply is not available. Generally speaking, RAM and CPU cache memory are examples of volatile memory whereas ROM and memory cards are examples of non-volatile memory.

The processor 702 executes instructions retrieved from the memory 704 in carrying out various functions, particularly in responding to search queries with improved search results based, at least in part, on interest circles. The processor 702 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; and the like.

The system bus 710 provides an interface for search engine's components to inter-communicate. The system bus 710 can be of any of several types of bus structures that can interconnect the various components (including both internal and external components). The illustrative search engine 110 further includes a network communication component 712 for interconnecting the search engine with other computers (such as user computers 102-106 and networking sites 112-116) as well as other devices on a computer network 108. The network communication component 712 may be configured to communicate with an external network, such as network 108, via a wired connection, a wireless connection, or both.

The search results retrieval component 714 identifies search results responsive to the search engine 110 receiving a search query from a computer user 101. The search engine 110 identifies the search results according to information in the content store 722. The content store 722 includes information regarding content distributed throughout many locations on the network 108. Typically, but not exclusively, the content store is indexed according to many keys which may include the query topic of the search query.

The search results page generator 716 generates one or more search results pages that may be presented to the requesting computer user 101 in response to the received search query. The search results page generator 610 generates the search results pages based on the search results identified by the search results retrieval component 608 after they have been ranked and/or ordered, at least in part, according to the search results ranking component 718. The search results ranking component 718 is responsible for identifying a group 401 of computer users having interest circles corresponding to the query topic of the received search query and ranking the identified search results according to the interest circles. The search results ranking component 718 may operate in conjunction with the interest circles generator 204 in identifying the group 401 of computer users having interest circles corresponding to the query topic of the received search query.

The interest circles generator 204, as described above, is responsible (at least in part) for evaluating, analyzing, and mining the network navigation data 202 of each of a plurality of computer users, and storing the generated sets 720 of interest circles in the interest circles store 206. While the interest circles content store 206 and the content store 722 are identified as separate components, this is for descriptive purposes and may or may not correspond to an actual embodiment. In at least one embodiment, the interest circles content store 206 is included within the content store 722.

Those skilled in the art will appreciate that the various components described above, including the interest circles generator 204, the search results retrieval component 714, the search results page generator 716, and the search results ranking component 718 may be implemented as executable software modules within the search engines 110, as executable hardware modules, or a combination of the two. Moreover, each of the various components may be implemented as an independent, cooperative process or device, operating in conjunction with the search engine 110. It should be further appreciated, of course, that the various components described above in regard to the search engine 110 should be viewed as logical components for carrying out the various described functions. As those skilled in the art appreciate, logical components (or subsystems) may or may not correspond directly in a one-to-one manner to actual components. In an actual embodiment, the various components identified as being part of the search engine 110 in FIG. 7 may be combined together or broke up across multiple actual components and/or implemented as cooperative processes on a computer network 108.

Figure 8:
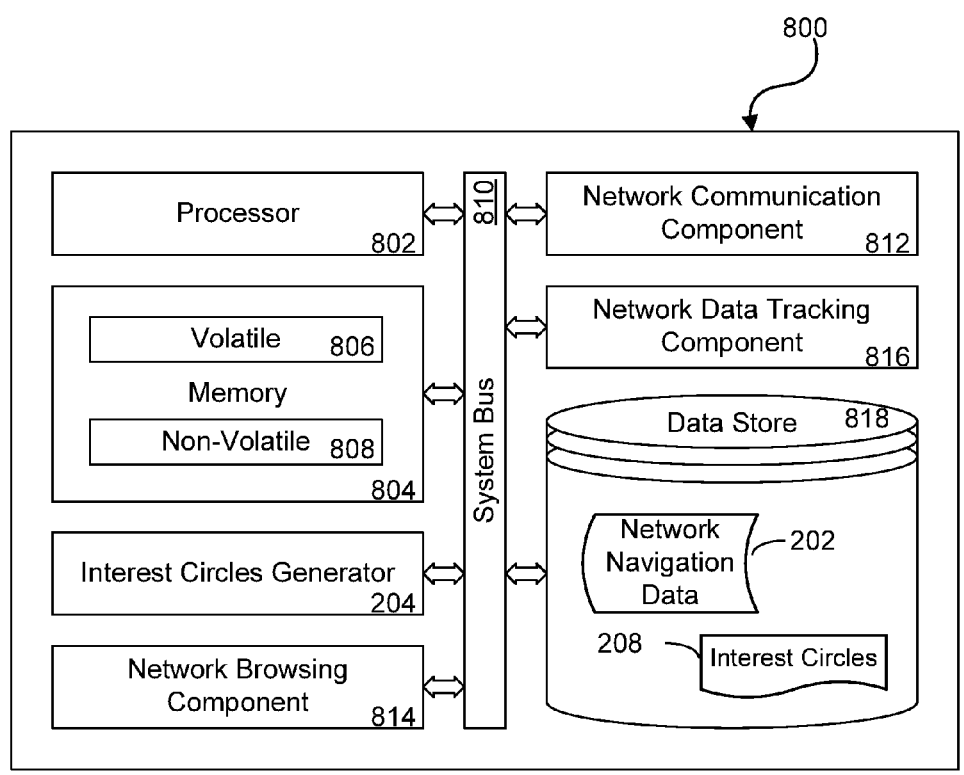
FIG. 8 is a block diagram illustrating a computer user computing device configured to track navigation data corresponding to the computer user as well as generate interest circles for the computer user.

As indicated above, interest circles for a particular computer user are formed from the navigation data 202 gathered for the computer user. Moreover, the interest circles may be generated by an interest circles generator 204 located remotely from the computer user's computing device, such as described above in regard to FIG. 7, or on the computer user's computing device and provided to the search engine 110 for storage in the interest circles store 206. To that end, FIG. 8 is a block diagram illustrating a computer user's computing device 800 configured to track navigation data of the computer user as well as generate interest circles for the computer user. The computing device 800 includes a processor 802 (or processing unit) and a memory 804 interconnected by way of a system bus 810. As discussed above in regard to FIG. 7, memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory whereas ROM and memory cards are examples of non-volatile memory.

The processor 802 executes instructions retrieved from the memory 804 in carrying out various functions, including tracking navigation information of the computer user to generate navigation data 202 as well as generating interest circles 208 by way of an interest circles generator 204, such as described above. The computing device 800 further includes a network communication component 812 for interconnecting the device with other computers (such as user computers 102-106, search engine 110, and networking sites 112-116) as well as other devices on a computer network 108. The network communication component 812 may be configured to communicate with an external network, such as network 108, via a wired connection, a wireless connection, or both.

The computing device 800 also includes a network browsing component 814. The network browsing component 814 is that component through which the computer user is able to navigate to various sites on the network 108. The network browsing component 814 may be implemented as a hardware component or as an executable software component. One example of a software-implemented network browsing component 814 includes Microsoft Corporation's Internet Explorer®. Also included in the computing device 800 is a network data tracking component 816. The network data tracking component 816 tracks the navigation information of the computer user (working in conjunction with the network browsing component 814) and stores the navigation data 202 in a data store 818. Still further included in the computing device 800 is an interest circles generator 204 that digests the network navigation data 202 and generates one or more interest circles 208 for the computer user. In this configuration, the interest circles are provided to a central location, such as the interest circles store 206 (of FIG. 7) such that the search engine 110 can draw upon them in responding to search queries for other computer users.

As with the search engine 110 shown in FIG. 7, the various components described above for the computer device 800, including the interest circles generator 204 and the network data tracking component 816 may be implemented as executable software modules within the computing device 800, as executable hardware modules, or a combination of the two. It should be further appreciated, of course, that the various components described above in regard to the computing device 800 should be viewed as logical components for carrying out the various described functions. As those skilled in the art appreciate, logical components (or subsystems) may or may not correspond directly in a one-to-one manner to actual components.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for responding to a search query from a user, the method comprising:
receiving a search query from a requesting computer user, the search query being directed to a query topic;
obtaining a set of search results responsive to the search query; and
determining whether the requesting computer has an interest circle corresponding to the query topic and, upon determining the condition that the requesting computer user does not have an interest circle corresponding to the query topic:
identifying a plurality of computer users, each of the plurality of computer users having an established interest circle corresponding to the query topic, wherein identifying the plurality of computer users comprises identifying the plurality of computer users irrespective of any user-established relationship with the requesting computer user;
ordering the set of search results according to the interest circles of the identified plurality of computer users; and
returning higher ordered search results to the requesting computer user.

2. The computer-implemented method of claim 1, identifying the plurality of computer users comprises identifying the plurality of computer users according to each of the plurality of computer users having an established interest circle corresponding to the query topic and a commonality between interest circles of each of the plurality of computer users and interest circles of the requesting computer user.

3. The computer-implemented method of claim 2, wherein the commonality between the interest circles of each of the plurality of computer users and interest circles of the requesting computer user exceeds a predetermined threshold of similarity.

4. The computer-implemented method of claim 1, wherein the requesting computer user does not have an interest circle corresponding to the query topic.

5. The computer-implemented method of claim 1, wherein ordering the set of search results comprises ordering the set of search results according to the interest circles of the identified plurality of computer users and according to an interest circle of the requesting computer user corresponding to the query topic.

6. The computer-implemented method of claim 1, further comprising:
obtaining network navigation data of a second plurality of computer users; and
for each of the second plurality of computer users:
identifying a set of interest circles corresponding to the computer user based on the computer user's network navigation data; and
storing the set of interest circles in an interest circles store in association with the computer user.

7. The computer-implemented method of claim 1 further comprises inferring at least one additional search result according to an additional interest circle of at least one computer user of the identified plurality of computer users, wherein the requesting computer user does not have an established interest circle corresponding to the additional interest circle of the at least one computer user; and
wherein returning higher ordered search results to the requesting computer user comprises returning higher ordered search results to the requesting computer user and the at least one additional search result.

8. A computer-readable medium bearing computer-executable instructions which, when executed on a computing system comprising at least a processor executing instructions retrieved from the medium, carry out a method for responding to a search query from a user, the method comprising:

obtaining network navigation data of a first plurality of computer users, and for each of the first plurality of computer users:

identifying a set of interest circles corresponding to the computer user based on the computer user's network navigation data; and storing the set of interest circles in an interest circles store in association with the computer user; receiving a search query from a requesting computer user, the search query being directed to a query topic;

obtaining a set of search results responsive to the search query; and determining whether the requesting user has an interest circle corresponding to the query topic and, upon the condition of determining that the requesting user does not have an interest circle corresponding to the query topic:

identifying a second plurality of computer users, each of the second plurality of computer users being identified as having an established interest circle corresponding to the query topic, wherein identifying the second plurality of computer users comprises identifying the second plurality of computer users irrespective of any user-established relationship with the requesting computer user;

ordering the set of search results according to the interest circles of the identified second plurality of computer users; and returning higher ordered search results to the requesting computer user.

9. The computer-readable medium of claim 8, wherein identifying the second plurality of computer users comprises identifying the second plurality of computer users as having an established interest circle corresponding to the query topic and a commonality between interest circles of each of the second plurality of computer users and interest circles of the requesting computer user.

10. The computer-readable medium of claim 9, wherein the commonality between the interest circles of each of the second plurality of computer users and interest circles of the requesting computer user exceeds a predetermined threshold of similarity.

11. The computer-readable medium of claim 8, wherein the requesting computer user does not have an interest circle corresponding to the query topic.

12. The computer-readable medium of claim 8, wherein ordering the set of search results comprises ordering the set of search results according to the interest circles of the identified second plurality of computer users and according to an interest circle of the requesting computer user corresponding to the query topic.

13. The computer-readable medium of claim 8, wherein the requesting computer user is one of the first plurality of computer users.

14. The computer-readable medium of claim 8, wherein the method further comprises inferring at least one additional search result according to an additional interest circle of at least one computer user of the identified second plurality of computer users, wherein the requesting computer user does not have an established interest circle corresponding to the additional interest circle of the at least one computer user; and wherein returning higher ordered search results to the requesting computer user comprises returning higher ordered search results to the requesting computer user and the at least one additional search result.

15. A computer system for responding to a search query with search results, the system comprising a processor and a memory, wherein the processor executes instructions stored in the memory as part of or in conjunction with additional components to respond to a search query, the additional components comprising:

a network communication component configured to receive queries over a network and respond to the queries with search results;

a search results retrieval component that identifies a plurality of search results responsive to a query topic of the search query; and a search results ranking component that is configured to:

determine whether a requesting user has an interest circle corresponding to the query topic of the search query and, upon the condition that the requesting user does not have an interest circle corresponding to the query topic:

identify a plurality of computer users, wherein each of the plurality of computer users is identified as having an established interest circle corresponding to the query topic of the search query, and wherein identifying the plurality of computer users comprises identifying the plurality of computer users irrespective of any user-established relationship with the requesting computer user; and order the set of search results according to the interest circles of the identified plurality of computer users; and a search results page generator that generates one or more search results pages according to the higher ordered search results and returns the one or more search results pages to the requesting computer user.

16. The computer system of claim 15 further comprising: an interest circles generator configured to: obtains network navigation data for a second plurality of computer users; and for each of the second plurality of computer users: process the network navigation data for the computer user into a corresponding set of interest circles for the computer user; and store the set of interest circles for the computer user in an interest circles store in association with the computer user.

17. The computer system of claim 15, wherein search results ranking component is further configured to:

infer at least one additional search result according to an additional interest circle of at least one computer user of the identified plurality of computer users, wherein the requesting computer user does not have an established interest circle corresponding to the additional interest circle of the at least one computer user; and wherein returning higher ordered search results to the requesting computer user comprises returning higher ordered search results to the requesting computer user and the at least one additional search result.

18. The computer system of claim 15, wherein the search results ranking component identifies the plurality of computer users as having an established interest circle corresponding to the query topic and a commonality between interest circles of each of the plurality of computer users and interest circles of the requesting computer user.

* * * * *